United States Patent [19]
Weintraub et al.

[11] 3,735,344
[45] May 22, 1973

[54] TIRE PRESSURE MEASUREMENT SYSTEM

[75] Inventors: Arthur Weintraub; Wendell A. Cook, both of Fort Wayne; Robert K. Gatwod, Churubusco; Kenneth L. De Brosse, Fort Wayne, all of Ind.

[73] Assignee: International Telephone and Telegraph Corporation, Nutley, N.J.

[22] Filed: May 20, 1971

[21] Appl. No.: 145,372

[52] U.S. Cl..................................340/58, 73/146
[51] Int. Cl............................G01l 9/00, B60c 23/06
[58] Field of Search..........................73/146, 146.2; 340/58; 177/134, 135, 136; 200/61.22, 61.23

[56] References Cited

UNITED STATES PATENTS

| | | | |
|---|---|---|---|
| 820,041 | 5/1906 | Ferdinand | 200/61.22 |
| 2,317,509 | 4/1943 | Anderson | 200/61.23 |
| 2,313,156 | 3/1943 | Kratt, Jr. | 73/146 |
| 3,303,571 | 2/1967 | Veals | 73/146 |

*Primary Examiner*—Donald O. Woodiel
*Attorney*—C. Cornell Remsen, Jr., Walter J. Baum, Paul W. Hemminger et al.

[57] ABSTRACT

A measurement system for pneumatic vehicle tires wherein a narrow probe aligned with the center rib of a vehicle tire is depressed by said tire against the force of a spring. A sufficiently inflated tire will depress said probe thereby pivoting a lever causing the closing of a microswitch. A logic circuit is connected to said microswitch to distinguish between front and rear tires and to start, cycle and reset the system.

8 Claims, 5 Drawing Figures

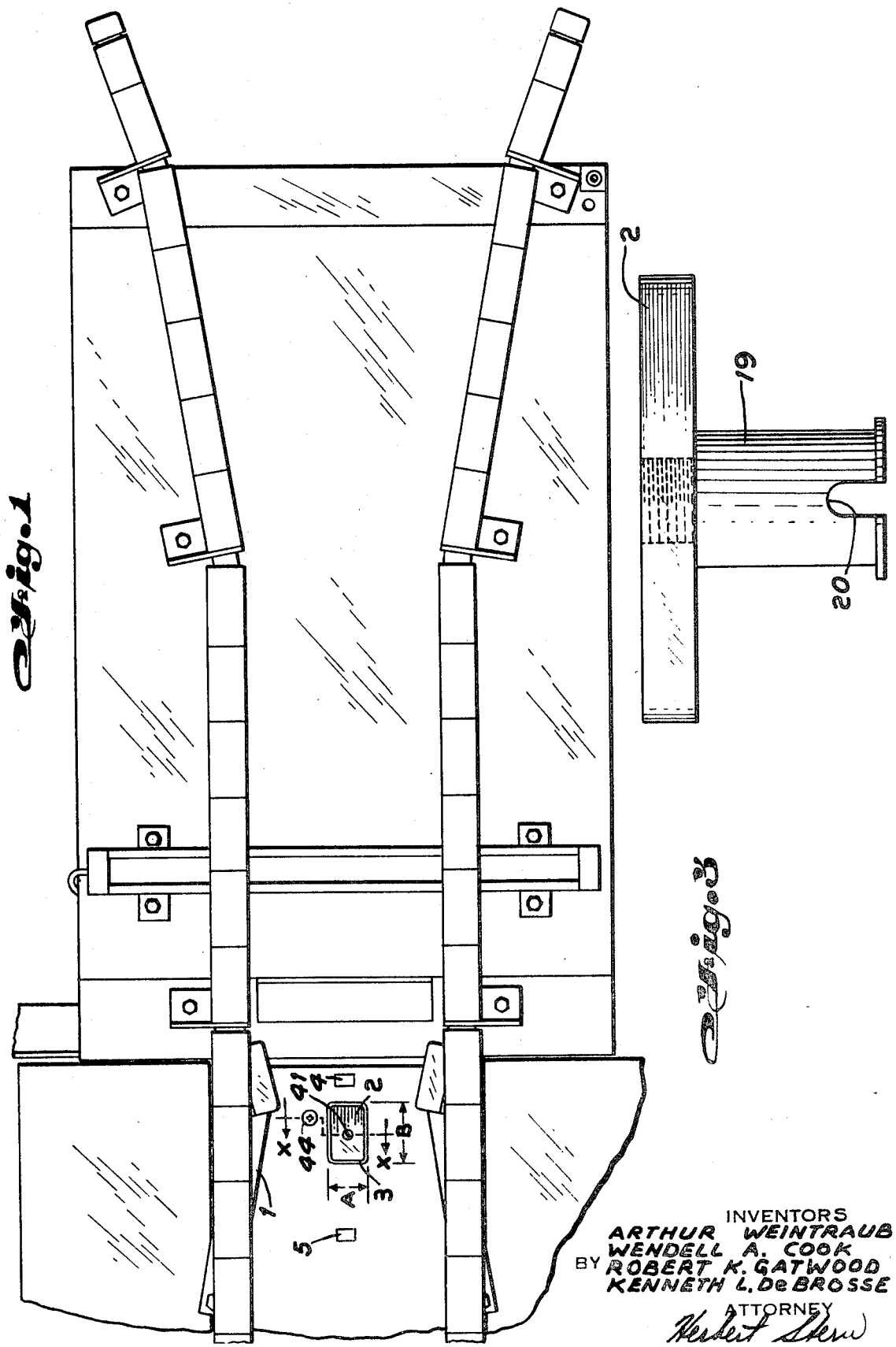

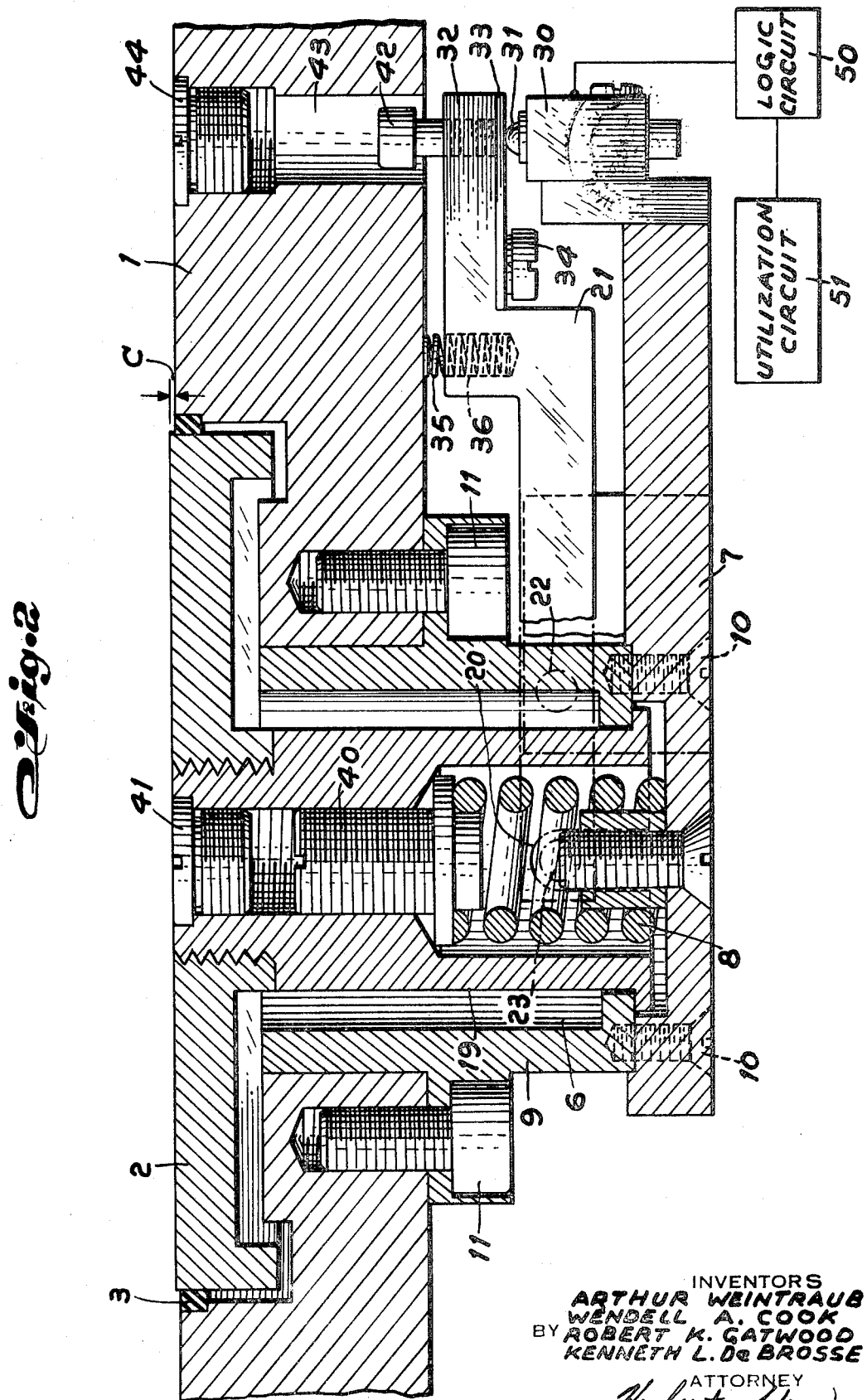

2

TIRE PRESSURE MEASUREMENT SYSTEM

BACKGROUND OF THE INVENTION

This invention relates to an automatic tire pressure measurement system, and more particularly to such a system utilizing a pressure plate which is depressed by a tire under test.

Automatic pressure measurement systems known in the art are frequently of the type which measure the footprint of the tire under test on the theory that a larger footprint indicates a lower pressure. These systems, however, of which U.S. Pat. No. 1,849,730 is an example, are inaccurate and deficient in that it is impossible to distinguish the footprint made by a tire inflated to a high pressure which is under heavy load from the footprint made by a tire which is filled to a low pressure but which is under no load, assuming, of course, equal tire sizes.

Another type of automatic tire pressure measurement system known in the art, of which U.S. Pat. No. 2,126,327 is an example, incorporates pressure sensors which are no more than sacs containing a fluid, either liquid or gaseous, which are compressed by a tire rolling over the sensor and operate on the theory that the greater the air pressure in the tire under test the greater is the contraction of the fluid filled sac. This last mentioned system is unsatisfactory, however, in that, among other deficiencies, the fluid filled sac tends to degrade with time and usage and therefore has to be frequently recalibrated, and the weight of the car contributes, to a great extent, to the degree to which the sac is contracted.

SUMMARY OF THE INVENTION

Therefore, the main object of this invention is to provide an automatic tire pressure measurement system which is capable of accurately determining if the air pressure in a tire under test is above or below a selected level.

A further object of this invention is to provide such a measurement system which is independent of the weight of the vehicle supported by said tire.

A further object of this invention is to provide a tire pressure measurement system which is independent of the size of the tire under test.

According to the present invention there is provided a tire inflation pressure measurement system comprising support means, sensor means, coupled to said support means, positioned to be contacted by the center rib of a tire under test and adapted to move vertically a distance related to the pressure in said tire, and switching means responsive to the vertical movement of said sensor means for measuring the air pressure in said tire.

Further objects and features of this invention will become more apparent by reference to the following description taken in conjunction with the accompanying drawings, in which:

BRIEF DESCRIPTION OF THE DRAWINGS

FIG. 1 is a plan view of an arrangement according to the invention;

FIG. 2 is a partially sectioned front view of an arrangement according to the invention along the line X—X of FIG. 1;

FIG. 3 is a front view of a pressure plate utilized in the instant arrangement;

DESCRIPTION OF THE PREFERRED EMBODIMENT

Figure 4:
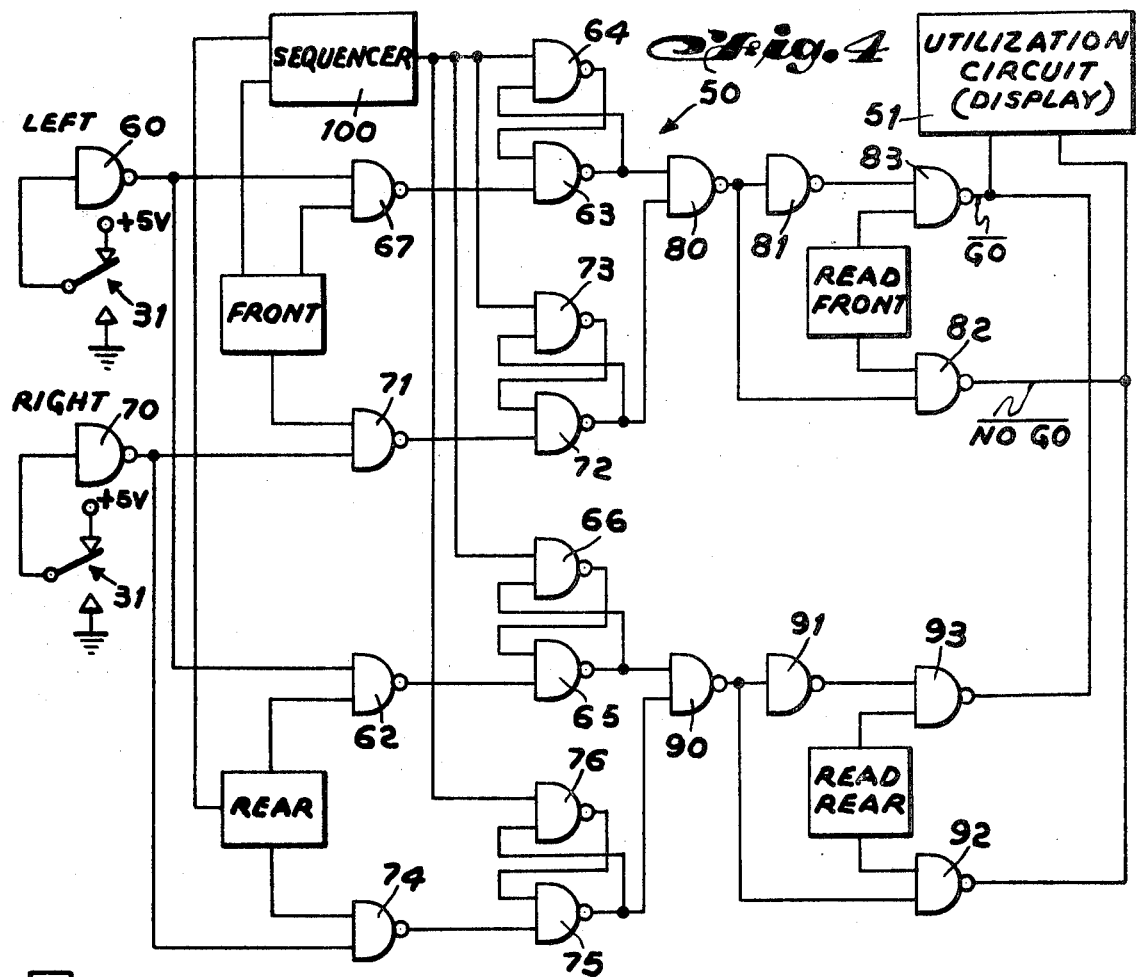
FIG. 4 is a schematic diagram of the logic circuitry utilized in conjunction with the arrangement.

Referring now to FIG. 1 there is shown a top plan view of one track of a two-track system including a floating, self-centering support plate 1 which includes a centering unit of a type well known in the art and fixed guide rails, a pressure plate 2 mounted in said support, said pressure plate being weather-proofed by a rubber seal or gasket 3, a system control unit 4 and a system control unit 5, all of which will be subsequently explained in greater deal.

An automobile supported by inflated tires, it being desired to determine if the inflation pressure is above or below a selected level, is rolled on to plate 1 in a forward direction, system control button 4 being contacted, for example, by the left front tire of the vehicle. The right front tire rolls on to a unit, not shown, similar to that shown in FIG. 1 excepting that no fixed guide rails are provided so that a vehicle with any tread width can be accommodated. The contacting of the system control units begins the operation of the system in a way which will be explained below.

Referring now to FIG. 2, there is shown a partially sectioned front view of FIG. 1 including the pressure plate 2 and the rubber seal or gasket 3. The pressure plate 2 and rubber seal 3 are fitted into an aperture in support plate 1 and plate 2 is slideably mounted therein by means of a teflon bushing 6. The pressure plate is supported against an underplate 7 by a compression spring 8 and the underplate 7 is connected to vertical assembly 9 by means of screws or other connecting means 10, vertical assembly 9 in turn being connected to plate support 1 by screws 11, or other connection means. The pressure plate 2, which is more clearly illustrated in FIG. 3, is T-shaped, the single leg 19 of the T being cylindrical and the spring fitting within said cylindrical leg. The cylindrical leg is formed with a semi-circular aperture 20 therein and a lever 21 is pivotally connected to the vertical assembly 9 by pin 22. Lever 21 further is coupled to the semicircular aperture 20 by a pin 23 and it will now be clear that lever 21, in the region of pin 23, will move in an up and down direction as plate 2 is moved in an up and down direction by opposing forces applied thereto by a tire under test and the spring 8.

A microswitch 30, having a contact 31, is connected by any known means, for example by a screw or by glue, etc., to support plate 7 so that end 32 of lever 21 may come into and out of contact with contact 31 as lever 21 pivots about pivot 22. A contact plate 33 is connected to end 32 of lever 21 by a screw 34 and the plate 33 is pressed in a direction toward contact 31 by the action of spring 35 which is mounted between the underside of support plate 1 and a slot 36 in end 32 of lever 21, so as to provide the bias necessary to depress contact 31 when no tire is depressing plate 2.

Adjustments to the system may be made by means of a screw 40 which is used to adjust the compression of spring 8 and is accessible through screw 41 located in pressure plate 2, and by means of a screw 42 which is positioned in an aperture 43 provided in support plate 1 which is accessible through screw 44 and which controls the distance the end 32 of lever 21 must move in a vertical direction to release the pressure applied to contact 31 by contact plate 33, since the screw 42 controls the spacing between plate 33 and the underside of end 32 of lever 21.

A logic circuit 50 is electrically connected to microswitch 30 and provides suitable output signals to utilization circuit 51 in a manner which will be described below.

When the air pressure in a tire is to be measured relative to a selected level the vehicle on which the tire is mounted is rolled in a direction perpendicular to the plane of FIG. 2 over pressure plate 2 in a carefully aligned manner by means of the aforementioned guide rails and floating, self-centering plate 1, so that pressure plate 2, which has a dimension A of approximately 1.6 inches and a dimension B of approximately 2.5 inches, is in contact with the center rib of the tire under test. The pressure plate 2, which extends a slight distance C, for example, 0.010–0.015 inches above the surface of the support plate 1, is depressed by the tire and the amount of depression, against the force of compression spring 8, may be used to determine if the tire under test is sufficiently inflated.

Briefly, the theory of operation of the subject device is as follows. It will be clear to those skilled in the art that a tire sufficiently inflated, for example, inflated to 26 psi or more, will be hard enough to depress plate 2 against the force of spring 8 while an underinflated tire, i.e., one inflated to less than 26 psi, will itself be indented by the force of the spring acting through the pressure plate. At this point it would appear that the weight of the car, as well as the inflation of the tire under test, would have a major effect on the degree to which pressure plate 2 will be depressed. It is known in the art, however, that approximately 85 percent of the weight supported by a tire is supported by the outer edges of the tire and it has, therefore, been found advantageous to use a plate approximately 1½–1¾ inches wide and to allow only the narrow center rib portion and adjacent areas of the tire to contact the pressure plate. Calculations have shown that the weight to which the pressure plate is subjected by the front tire of a 5,000 pound automobile is approximately 100 pounds greater than the weight to which the pressure plate is subjected by the rear wheel and this weight differential is negligible in comparison to the effect on the pressure measurement system due to the pressure of tire inflation.

It will now be clear that the vertical movement of pressure plate 2 will be directly related to the inflation pressure of the tire under test and that the weight of the car under test will have virtually no effect on the readings obtained. Experimental results obtained utilizing cars of different weights and tires of different sizes indicate that the accuracy of the system is such that it will pass 90 percent of the tires inflated to 28 psi or more and fail 90 percent of the tires inflated to 26 psi or less when a nominal pressure of 27 psi is selected for the system.

Turning now to FIG. 4, there is illustrated the logic network 50, composed solely of NAND gates, which is utilized in conjunction with the system, and the operation of which will now be explained.

As a vehicle enters the test area a tire, for example the left front tire, contacts system control unit or button 4 activating the entire system through sequencer 100 which will be explained below, by taking said system out of a reset condition and preparing it to measure the inflation pressure in the front tires. Logic network 50 is now clear and if the tire is sufficiently hard it causes the closing of contact 31 of microswitch 30. The closing of contact 31 causes the application of a ground, or logic "0" to the input of gate 60 which in turn causes a logic "1" to appear at the output thereof. The logic "1" transmitted by gate 60 is applied to one input of gate 67 and one input of gate 62. Since this is a front tire the other of the two inputs of gate 67 will also be a "1" provided by sequencer 100, while the other of the two inputs of gate 62 will be a "0" as provided by sequencer 100. It will now be seen that the output of gate 67 will go to a "0" condition from the "1" condition in which it was in its original state, said "0" being transmitted to the input of gate 63 while the output of gate 62 remains "1" and therefore does not change. The "0" applied to the input of gate 63 causes a "1" output from gate 63, and the combination of gates 63 and 64 operates as a hold flip-flop which will maintain its condition even after the tire inflation signal which caused the "0" input to gate 60 is removed, while the flip-flop composed of gates 65 and 66 has not been affected due to the "1" output from gate 62, since gate 62 has not changed its condition and each of the flip-flops discussed herein are of the type which respond to the negative going edge which occurs when a pulse changes from a "1" to a "0." Assuming that the right front tire is also sufficiently inflated, a "0" has been applied to gate 70 and this has been transmitted via gates 71–73 to the output of gate 72 as a "1," as discussed above. The output "1" from gate 70, has of course, also been transmitted to gate 74, but as discussed above with regard to gate 71, since a rear signal "1" is not applied to the other input of gate 74 from sequencer 100, gates 75 and 76 which form a flip-flop are not affected. The two "1's" transmitted from gates 63 and 72 are applied to the inputs of gate 80 providing a "0" output which is transmitted to the input of gate 81 and to one input of gate 82. The output "1" provided by gate 81 is applied to one input of gate 83 and the "0" and "1" applied to gates 82 and 83 respectively will remain there, due to the holding action of the flip-flops composed of gates 63 and 64 and 72 and 73 until a request is made to read the front tire signal, this request being made by, for example, a pushbutton or some automatic means, such as a clock.

The same operation as previously discussed with respect to the front tires is repeated with respect to the rear tires with the exception that now a "1" signal is applied to gates 62 and 74 from sequencer 100 resulting in "1" outputs from gates 65 and 75 which are transmitted to gate 90, it being seen that the outputs from gates 67 and 71, although having changed from "0's" to "1's" will not affect the output signals from their following flip-flops since no negative going edge has occurred and a system reset signal has not occurred. The output from gate 90 is a "0" which is transmitted to the input of gate 91 and one input of gate 92. The "1" output from gate 91 is transmitted to one input of gate 93 and the "0" and "1" on gates 92 and 93, respectively will remain there until there is a request to read the rear tire result as discussed above with regard to the front tires. Upon a request to read the condition of the front tires, "1's" are applied to the inputs of gates 82 and 83, the output of gate 82 being a "1" and the output of gate 83 being a "0." The output of gate 82 is connected to a NoGo which may be interpreted to be a tire pass signal and the output of gate 83 is a "0" connected to the Go which is also a pass signal, i.e. a "0" has been applied to the fail line implying a pass condition. These signals are applied to utilization circuitry 51, which may be display means and result in an indication that the front tires have both passed, i.e., are sufficiently inflated. The read rear tire condition signal may now be applied providing "1's" to gates 92 and 93 and these two will cause pass signals to be transmitted to utilization circuit 51.

A discussion of the operation of the system which occurs when a tire is underinflated will now be provided and for the discussion an underinflated condition of the right rear tire is selected. The left rear tire will provide a "0" input to gate 60, thereby providing a "1" output therefrom which is transmitted to one input of gate 62. The other input of gate 62 is also provided with a "1" by sequencer 100 thereby providing a "0" output from gate 62 which causes a "1" output from gate 65, said "1" output being applied to one input of gate 90. The right rear tire is underinflated and is not sufficiently hard to depress pressure plate 2. The failure to depress pressure plate 2 results in contact 31 of switch 30 remaining open and a "1" is therefore provided as an input to gate 70 resulting in a "0" output which is transmitted to one input of gate 74, the other input of gate 74 being a "1" from the rear tire actuator. The output from gate 74 is a "1" and this "1" is applied to the input of gate 75. Since the output of gate 74 was a "1" in its original condition there has been no change in the output of gate 74; therefore, no negative going edge has occurred and therefore the output of the flip-flop composed of gates 75 and 76 remains unchanged and is a "0." The "0" output from gate 75 is applied to the other input of gate 90 resulting in a "1" output therefrom which is transmitted to gate 91 and to one input of gate 92. The output of gate 91 is "0" and is transmitted to gate 93 where it remains until requested by the read rear signal, as does the "1" input to gate 92. When the read rear signal occurs it is seen that gate 92 provides a "0" output to the NoGo line which may be stated to be a "0" to the pass line thereby resulting in a failure signal. At the same time the output from gate 93 is a "1" which is transmitted to the Go which may be restated as being a "1" to the fail line, thereby also resulting in a fail indication.

It is thus seen that this system measures the tires in pairs and is capable of determining if all four tires are sufficiently inflated or if any one of the tires is underinflated. If one of the tires is underinflated, the system can inform the operator whether the underinflated tire was one of the front pair or one of the rear pair.

The operation of sequencer 100 and its function of setting, resetting and cycling the system will now be explained with regard to FIG. 5. It is desired that the sequencer perform the following functions. Firstly, as a front tire contacts button 4 the logic system should be taken out of reset and should be prepared to apply a "front tire present" signal to NAND gates 67 and 71. After the front tire passes over pressure plate 2 and contacts button 5, and a rear tire contacts button 4, the system should be prepared to provide a "rear tire present" signal to NAND gates 62 and 74 so that the rear tire pressure measurement may be made. After the rear tire contacts button 5 the system should be reset in preparation for the entrance of the next vehicle, and further, the system should be capable of distinguishing between front and rear tires so that when button 5 is depressed by a front tire, gates 62 and 74 have "1's" applied to their inputs rather than the system resetting. This last is accomplished by providing that after button 5 is contacted the system will apply a "1" to NAND gates 62 and 74 if button 4 is subsequently contacted within a selected period of time, for example 3 seconds, but if button 4 is not so contacted, then the logic system will reset.

Figure 5:
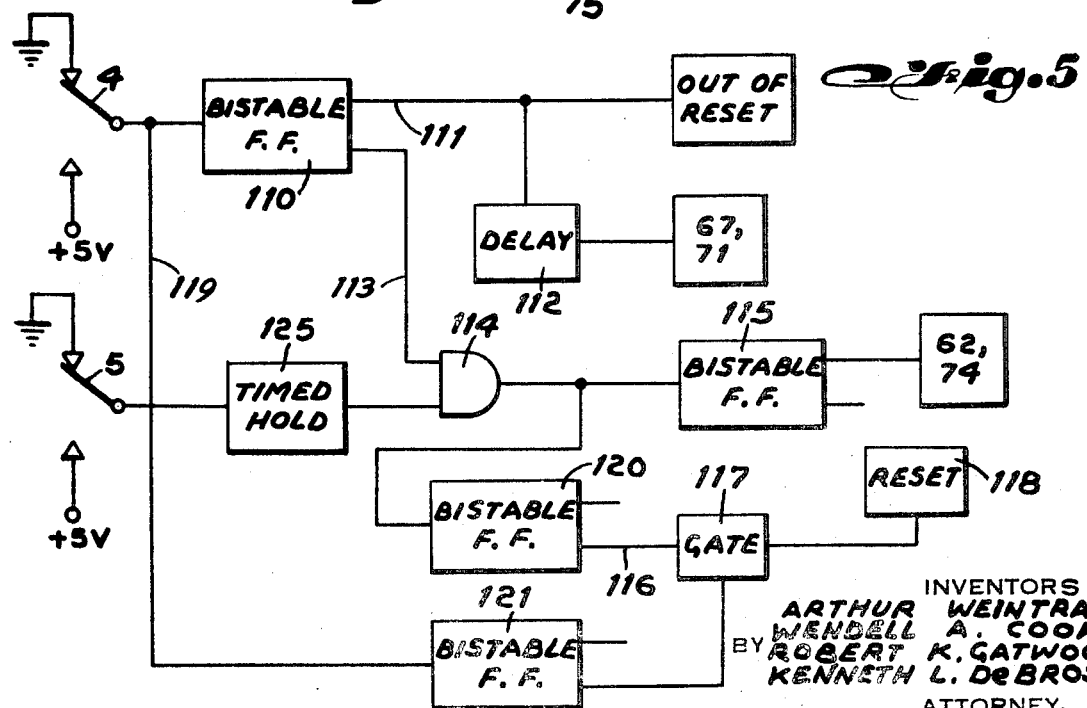
FIG. 5 is a schematic diagram of the sequence control portion of the logic circuit illustrated in FIG. 4.

Turning now to FIG. 5, it is seen that when control unit or button 4 is contacted by a front tire, a "1" is applied to bistable flip-flop 110 resulting in a "1" output on line 111 thereof, which serves to take the system out of reset and to apply a "1" signal to NAND gates 67 and 71 through delay unit 112, delay unit 112 providing a delay less than the time required by the tire to progress from unit 4 to pressure plate 2. At the same time a "0" has been transmitted on line 113 from flip-flop 110 to one input of AND gate 114. The "0" output from AND gate 114 is applied to bistable flip-flop 115 which provides a "0" input to NAND gates 62 and 74. The "0" output from AND gate 114 is also applied to bistable flip-flop 120 which provides a "1" output on output line 116 to a gate 117 which is connected to system reset 118. However, unit 4 has also applied a "1," on line 120 to bistable flip-flop 121 which provides a "0" output in response thereto, thereby blocking gate 117 and thus the "1" on line 116 is not transmitted to reset circuit 118. It is thus seen that the contacting of button 4 by a front tire does take the system out of its reset configuration and does prepare logic circuit 50 to measure the air pressure in the front tires. As the vehicle continues moving forward, and after the measurement has been made, the front tire will now contact unit or button 5 and thereby apply a "1" to a timed hold circuit 125 which transmits its input to AND gate 114 and also maintains it for a selected period of time; e.g., 3 seconds. The rear tire of the vehicle under test will now contact unit 4 and will do so within 3 seconds. At this point another "1" is transmitted to bistable flip-flop 110 providing a "0" on line 111 and a "1" on line 113. The "1" on line 113 will be transmitted to AND gate 114 at the same time the "1" from unit 5 is also applied to AND gate 114 through time hold circuit 125 and AND gate 114 thereby provides a "1" to both bistable flip-flop 115 and bistable flip-flop 120. Bistable flip-flop 115 now provides a "1" to NAND gates 62 and 74 thereby providing that the system will measure the air pressure in the rear tire and bistable flip-flop 120 will now provide a "0" output on line 116. The last contacting of button 4 has also caused the output of flip-flop 121 to be changed to a "1" thereby opening gate 117 but still not providing a reset signal to the system since a "0" is being transmitted to reset circuit 118 via line 116. It is now seen that when the rear tire comes on to the system gates 67 and 71 receive "0's" and gates 62 and 74 receive "1's." After the rear tire passes over pressure plate 2 it will contact button 5 and will thereby apply another "1" to timed hold unit 125. However, there will in this instance be a delay of more than 3 seconds prior to the next contacting of button 4 since it will take longer than 3 seconds for the next vehicle in line to contact the button and therefore bistable flip-flop 110 will still provide a "1" to AND gate 114 on line 113 and the other input to AND gate 114 will also be a "1" provided by button 5. The last "1" transmitted by gate 114 resets flip-flop 115 and a "0" is now applied to gates 62 and 74 as well as to gates 67 and 71 via line 111. The last "1" from gate 114 is also applied to flip-flop 120 and therefore provides a "1" on line 116 to gate 117, while flip-flop 121 has maintained the "1" on its output line which is transmitted to gate 117, opening the gate 117. Thus, the last pulse from flip-flop 120 is transmitted to reset circuit 118, resetting the system and preparing it for the next cycle.

While the principles of the invention have been described in connection with specific structure, it is to be clearly understood that this description is made only by way of example and not as a limitation to the scope of the invention as set forth in the objects thereof and in the accompanying claims.

We claim:

1. A tire inflation pressure measurement system comprising:
    support means for supporting and guiding a tire under test to pass over a predetermined location, said tire having an annular center rib resting on said support means;
    pressure sensor means slidably coupled to said support means and positioned at said location below said tire to be contacted by said center rib of said tire for vertical movement through a distance related to the air pressure in said tire;
    first switching means responsive to said vertical movement of said sensor means for actuation by a predetermined level of said air pressure in said tire, and means actuated by said first switching means for indicating the condition of said tire pressure with respect to said level.

2. The tire inflation measurement system, according to claim 1, wherein
    said support means is formed with an aperture therein and said pressure sensor means is located in said aperture,
    said sensor means including
        a rigid member; and
        a compression spring positioned between said member and said support means for resiliently urging said member in a first vertical direction.

3. The tire inflation pressure measurement system, according to claim 2, wherein said switching means comprises:
    a switch; and
    a lever pivotably mounted on said support means to actuate said switch in response to a predetermined vertical movement of said member in a second direction opposite said first direction.

4. The tire inflation pressure measurement system, according to claim 3, further comprising:
    first adjusting means supported by said member to vary the compression of said compression spring so as to vary the force with which said spring urges said member in said first direction; and
    second adjusting means coupled to said support means to vary the distance said lever must move to actuated said switch.

5. The tire inflation pressure measurement system, according to claim 3, wherein said means actuated by said switching means includes circuit means for providing a first information signal when the air pressure in said tire exceeds said predetermined level and a second information signal when said air pressure is below said predetermined level, and display means for indicating said signals.

6. The tire inflation pressure measurement system, according to claim 5, wherein said circuit means includes
    a logic network responsive to said first and second signals for storing said signals and actuating said display means;
    first control means connected to said logic network and positioned in the path of said tire at one side of said sensor to provide a signal responsive to the presence of said tire for preparing said network to respond to said first and second signals; and
    second control means connected to said logic network and positioned in said path at a side of said sensor opposite said one side to provide a signal responsive to the departure of said tire for resetting said network.

7. The tire inflation measurement system according to claim 6 including
    second support means for supporting and guiding a second tire of a pair of tires under test to pass over a second like predetermined location, each of said tires having an annular center rib resting on said support means;
    second pressure means slidably coupled to said second support means and positioned at said second location below said tire to be contacted by said center rib of said second tire for vertical movement through a distance related to the air pressure in said second tire;
    second switching means responsive to said vertical movement of said second sensor means for actuation by a predetermined level of said air pressure in said second tire, said means actuated by said first switching means also being actuated by said second switching means, said circuit means providing third and fourth signals respectively when said air pressure in said second tire exceeds and is below said level, said logic network also being responsive to said third and fourth signals, third and fourth control means connected to said logic network and being positioned in the path of said second tire to prepare said network to respond to said third and fourth signals and to respond to the presence and departure of said second tire for resetting said network, and said display means indicates the condition of said tire pressure in one of said first and second tires with respect to said level.

8. The tire inflation system for an automobile according to claim 7, including third and fourth tires to be tested and
    sequencing means coupled to receive said signals responsive to said presence and departure of said first and second tires to prepare said system to respond to the presence of said third and fourth tires.

* * * * *